United States Patent [19]

Keiswetter

[11] Patent Number: 4,676,376

[45] Date of Patent: Jun. 30, 1987

[54] TEMPORARY PROTECTIVE SEAT COVER

[75] Inventor: Paul C. Keiswetter, Charlevoix, Mich.

[73] Assignee: Petoskey Plastics, Inc., Petoskey, Mich.

[21] Appl. No.: 784,817

[22] Filed: Oct. 4, 1985

[51] Int. Cl.[4] .................... B65D 85/16; B65D 65/02; A47C 31/11
[52] U.S. Cl. .................... 206/494; 206/449; 150/52 R; 297/219; 297/229; 221/47
[58] Field of Search ............ 206/449, 494, 554; 150/52 R; 221/47, 33; 297/219, 229; 383/35

[56] References Cited

U.S. PATENT DOCUMENTS

| | | | |
|---|---|---|---|
| 770,973 | 9/1904 | Lippert | 297/219 |
| 2,227,180 | 12/1940 | Falk | 297/229 |
| 3,654,059 | 4/1972 | Zisblatt | 297/229 |
| 3,695,692 | 10/1972 | Williams | 297/229 |
| 3,884,355 | 5/1975 | Eriksson | 206/494 |
| 4,350,246 | 9/1982 | Mayer | 206/494 |

FOREIGN PATENT DOCUMENTS

| | | | |
|---|---|---|---|
| 2516528 | 10/1976 | Fed. Rep. of Germany | 297/219 |
| 1062196 | 4/1954 | France | 297/229 |
| 514644 | 11/1939 | United Kingdom | 297/229 |
| 1530825 | 11/1978 | United Kingdom | 297/219 |

Primary Examiner—William Price
Assistant Examiner—Brenda J. Ehrhardt
Attorney, Agent, or Firm—John A. Waters

[57] ABSTRACT

A temporary protective cover for an automobile seat or the like which comprises an elongated strip of film with a pocket or cap at the upper end that fits over the upper end of the set, with the remaining portion of the film extending downwardly over the front surface of the seat. The film is a co-extruded film formed of two different thermoplastic materials having different cling properties, such that a sticky side of the film faces inwardly against the seat and a slippery side faces outwardly. High density polyethylene forms one surface and low density or linear low density polyethylene forms the other surface. A seat cover thus formed clings to the seat and prevents dislodging of the seat cover even though the seat cover may be subjected to a sideways displacement force when a person or other object slides across the exterior surface of the seat cover. The seat covers are folded and stored individually in a convenient dispense box prior to use, with each cover being folded so that the inward sticky side contacts itself, leaving the exterior slippery side exposed for easy removal of the covers from the box. Also, when the sticky sides are separated, a static charge is generated that enhances the cling properties of the sticky side of the cover.

20 Claims, 6 Drawing Figures

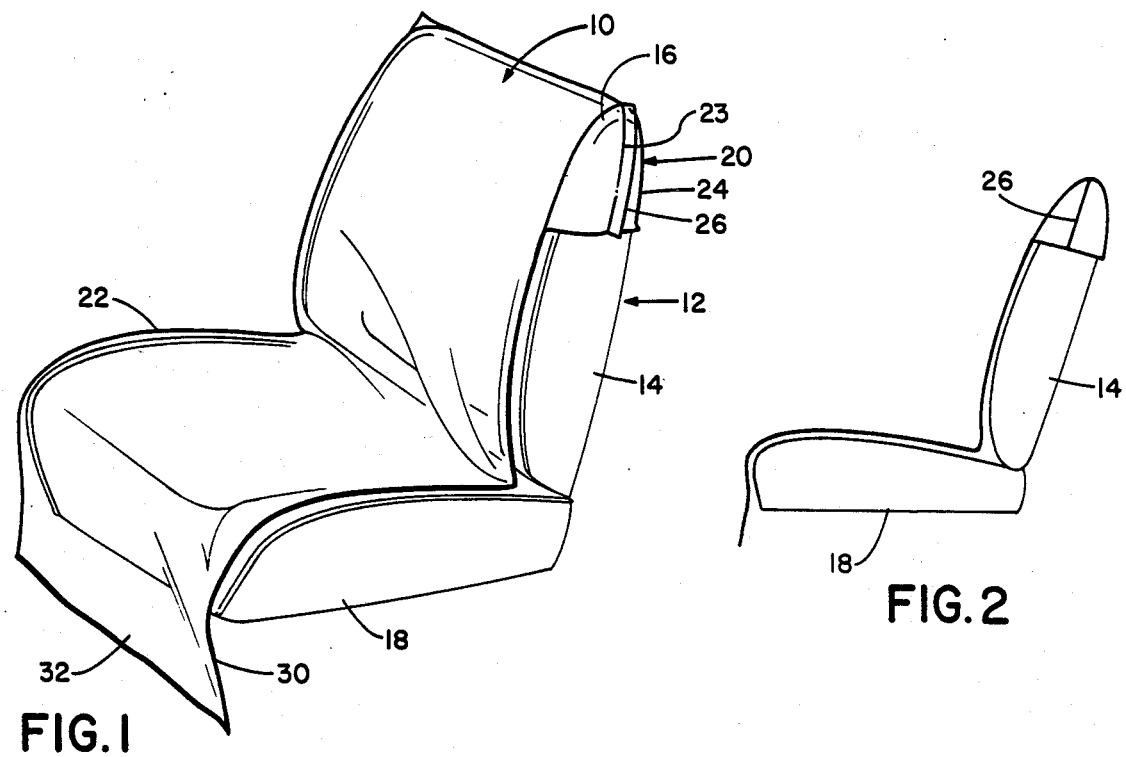
FIG.1
FIG.2
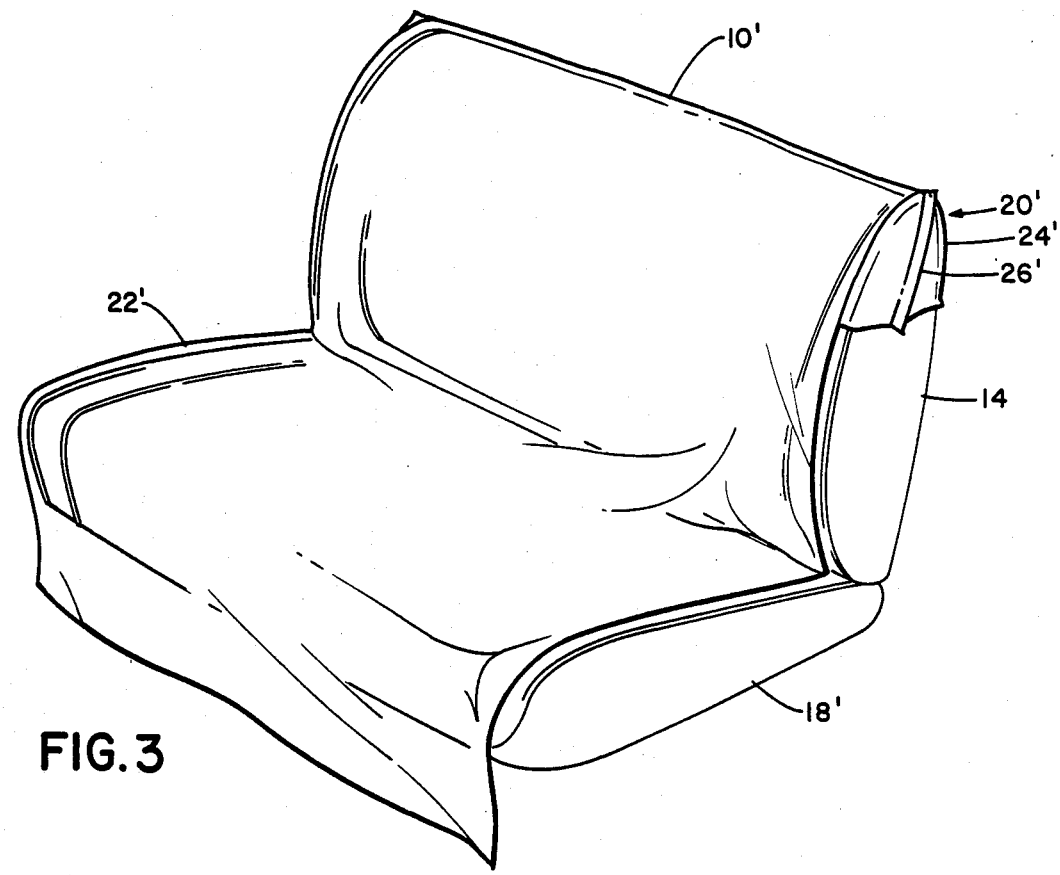
FIG.3

TEMPORARY PROTECTIVE SEAT COVER

BACKGROUND OF THE INVENTION

This invention relates to covers for seats or the like and especially automobile seats. One specific type of seat cover contemplated by this invention is a temporary one for protecting the seat from dirt, oils, grease or the like, wherein the seat cover clings to the seat but not to the person sitting on the seat cover, thus maintaining the seat cover in place even though a person may slide across the seat cover.

When an automobile is taken into a garage for repairs, it is desirable to cover the seat with a disposable, inexpensive cover that will protect the automobile upholstery from being soiled by grease, dirt, oils, or the like while the mechanic is repairing the automobile.

One of the more common coverings utilized for temporary protective seat covers for automobile is bulk polyethylene sheet or film. While this material provides acceptable barrier characteristics, it has limited strength and has a tendency to generate static electricity and cling to the person sitting on the seat, thus making it difficult to keep the seat cover in position and prevent it from interfering with the user. This material can fail in its desired purpose by shifting, clinging, or otherwise displacing so that the seat is left unprotected and becomes soiled. The film cannot be improved by adding stick or slip additives because they tend to migrate to both sides of the film.

Another form of protective material is craft paper, which similarly is used on a sheet roll that is cut to size by the user. While craft paper may not exhibit the same electrostatic or cling potential, it too may fail to perform its desired function, since it may easily slip out of place. In addition, the craft paper is not totally impervious to oils and greases. Thus, it does not provide the same degree of protection as the polyethylene sheet would.

Combinations of craft paper and polyethylene have been created by laminating the two to each other. While the overall properties of such coverings are improved, the cost of same is prohibitive. Also significant is the fact that such laminations tend to be harder to form around the seat, thereby frustrating the ease of use and, in some cases, the effectiveness of function.

An object of the present invention is to provide a strong and impervious, temporary seat covering that clings to the seat upholstery and remains in place and yet allows the user complete freedom from such clinging properties while sitting, entering, or exiting the seat. Such advantages are not known in the present art. A temporary, protective covering of more general application having the same imperviousness and cling properties also is an object of the present invention.

SUMMARY OF THE INVENTION

In accordance with the present invention, a temporary protective cover for protecting the surface of the seat or the like comprises a plastic film that is shaped to cover the surface and is integrally formed of at least two different plastic resins having different cling properties. Each of the plastic resins forms one of the opposite surface layers of the plastic film and cover. One plastic resin has properties that cause the surface formed of the resin to be relatively sticky, such that it tends to stick or cling to protected surfaces such as seat upholstery or the like. The other plastic resin has properties that cause the surface formed of that resin to be relatively slippery, such that the surface permits objects to slide over the surface without clinging thereto. The cling properties of the two plastic surfaces are sufficiently different that the cover tends to remain in its protective covering position when the sticky surface is placed against the protected surface, even though the more slippery side of the cover is subjected to a sideways dislodging force by a person or other object sliding across the cover.

As used herein, the terms "sticky" and "cling" refer to the general feelig one gets in using the invention. More technically these terms reflect primarily the coefficients of friction of the plastic resins, which is the resistance of the surface of the resin to a sideways shear or slip force. A tacky surface, such as a glue surface, resists a perpendicular separation of the surfaces.

The seat cover of the present invention comprises a strip of plastic film having a head portion at the upper end thereof, which includes a downwardly extending pocket that fits over the top of the seat. This strip then hangs from the top of the seat downwardly over the back and seat portions of the seat. The head is desirably formed of a folded over portion of film that is heat sealed along the side edges.

The plastic film of the present invention is a co-extruded plastic film wherein the opposite surface layers are formed of two different plastic resins. One of the surface layers desirably comprises low density polyethylene ("LDPE") or preferably linear low density polyethylene ("LLDPE"). LLDPE is desirable because it retains strength in thinner films. LLDPE can be used "barefoot" (i.e., without additives), except that an additive called "Aniblock" (a diatomaceous earth or sand) is recommended. This gives the surface of the LLDPE a slight bumpy texture and permits the surfaces to be separated, without eliminating the cling properties.

The other surface layer of the cover comprises high weight high density polyethylene ("HDPE"). This can be regular HDPE or high or medium molecular weight HDPE. Medium molecular weight HDPE is quite desirable. HDPE in combination with linear low density polyethylene provides a seat cover with good strength and barrier characteristics as well as the desirable difference in slipperiness.

Plastic film of the cover is formed in a thickness of 0.3 to 2.0 mils and preferably 0.8 to 1.0 mils. Thicker films are unnecessary. The minimum thinness is that thickness necessary to ensure that each resin provides full coverage over its side of the film. Films less than 0.3 mils might not provide full coverage for each component.

In the present invention the slippery side of the cover desirably has a coefficient of friction of 0.2 or less, whereas the sticky side has a greater coefficient of friction. A coefficient of friction of at least 0.5 is desirable and a coefficient of friction of about 0.7 or greater is expected for LLDPE.

Another feature of the present invention is that the covers are foiled and packaged in individual units in a box for easy dispensing with the sticky side of each cover being folded against itself and the slippery side of the cover constituting the outer surface of the folded unit. When the covers are unfolded, static electricity is generated by separating the sticky sides, and this enhances the cling properties of the cover. The outwardly facing slippery sides of the cover make it possible to pack the covers in a box in stacks without having the covers stick to each other as they are removed from the box one at a time.

The seat cover constructed in accordance with the present invention is an economical alternative to the offerings of the present art and provides a higher degree of actual protection and ease of usage.

The present invention is particularly directed to a temporary protective cover for an automobile seat. However, it is contemplated that such covers would have use in the home to protect furniture such as chairs and sofas or the like from pets that might climb up on the furniture or other contaminants.

These and other advantages and features of the present invention will become apparent from the detailed description of the preferred embodiment described below and shown in the appended drawings.

BRIEF DESCRIPTION OF THE DRAWINGS

FIG. 1 is a perspective view of an automobile seat employing a temporary protective seat cover in accordance with the present invention.

FIG. 2 is a side elevational view of the automobile seat and seat cover of FIG. 1.

FIG. 3 is a perspective view showing a bench type seat designed for two or more persons employing an enlarged temporary protective seat cover constructed in accordance with the present invention.

DETAILED DESCRIPTION OF PREFERRED EMBODIMENTS

Figure 5:
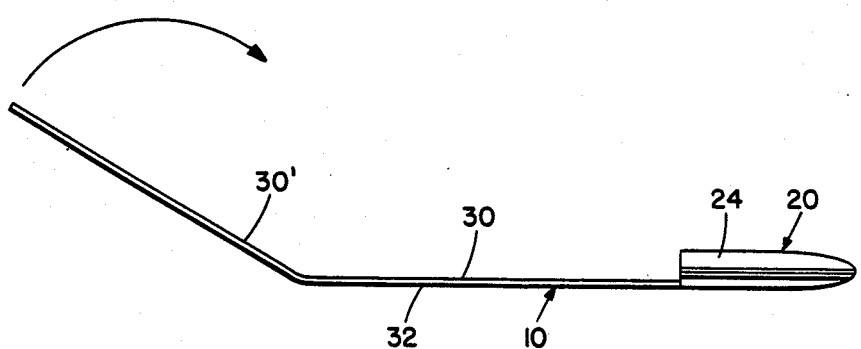
FIG. 5 is an edge view showing the seat cover in a further unfolded position.

Referring now to the drawings, a seat cover 10 constructed in accordance with the present invention is shown mounted on a seat 12 in FIG. 1. Seat 12 has a back portion 14 having an upper end 16 and having a seat portion 18. Seat cover 10 comprises a thin strip of plastic film having a pocket or cap 20 formed at an upper end thereof and having a front or lower portion 22 hanging down from the seat and extending over the back and seat portions of the seat. The seat cover is sufficiently long and wide to cover the back and seat portions and the entire width of at least an individual seat.

The cap or pocket formed on the upper end of the seat cover comprises a retainer portion 24 of film that overlaps the upper end of the portion of the film that protects the seat, with the retainer portion of the film being attached to the upper end of the film along upper and side edges, leaving a downwardly facing pocket that fits over the upper edge of the seat. Desirably, the retainer portion of the film is a portion of the film at the upper end that is folded along at the upper edge of the cover and sealed along side edges 26 by means of a heat seal 28 or the like.

Desirably the cover is formed in a tube during extrusion, with one edge of the tube being heat sealed along the sides to form the cap and the remaining portion of the cover being split open to form the bottom portion of the cover. The tube is cut into sections to form individual covers. While individual packaging of the covers is preferred, the tube can be perforated so that the seats can be mounted on a roll.

Another version of the seat cover is shown in FIG. 3 wherein the seat cover is substantially the same as the seat cover in FIGS. 1 and 2, with the exception that the seat cover is wider so that it can cover a bench type of automobile seat. In this embodiment, the same numerals are employed for features that are substantially the same as in the FIGS. 1 and 2 embodiments, with the exception that the numerals are primed. Seat cover 10' with cap 20' fits on the back 14' of a bench seat having seat portion 18'. The retainer portion 24' of the cap fits behind the seat and a heat sealed seam 26' joins the front of the cover with the retainer portion.

It should be noted that the seat cover is shaped so that it fits over the top edge of the seat in all embodiments and hangs down over the front surface of the back and seat portions of the seat, thereby providing protection for the surface of the seat. This construction is particularly desirable for automobile seats, wherein a temporary protective cover is desirable when a mechanic is working on a vehicle.

The seat cover material is a critical feature of the present invention and is responsible for the prime benefits achieved in the present invention. In accordance with the present invention, cover 10 is a thin film formed of at least two co-extruded plastic resins having different cling properties, with each plastic resin forming one side of the film. In the present invention, the co-extrusion comprises two thermoplastic resins, one being low density polyethylene ("LPDE") or preferably linear low density polyethylene ("LLDPE") and the other being high density polyethylene ("HDPE"). Medium molecular weight high density polyethylene is especially preferred but high molecular weight and regular HDPE also are desirable.

Considering the two preferred plastic resins, the HDPE has a lower coefficient of friction (desirably about 0.2 or less) than the LLDPE, which could have a higher coefficient of friction that can be 0.7 or so. The LLDPE is barefoot with the exception of a slip additive, Aniblock, that makes the surfaces of LLDPE more easy to separate, while still resisting sideways slip. The LLDPE also can maintain a static electric charge, a tendency which does not seem to be as pronounced with HDPE.

The co-extruded film of the present invention is considerably thinner than conventional sheet material yet is very strong and impermeable. The film is generally in the range of 0.8 mils to 1.0 mils in thickness but could be 0.3 to about 2.0 mils. In this range, the film provides sufficient strength and economy for use as a temporary seat cover.

The composition of the film as regards the two resins can be of almost any ratio of HDPE to LLDPE so long as the two component resins are physically segrated into the two surfaces of the film, that is, one resin forms a surface layer that completely covers one side of the film and the other resin forms a surface layer that completely covers the other side of the film. The LLDPE is stickier than the HDPE and thus forms the sticky side of the film, with the HDPE forming the slippery side of the film. In the preferred film, the HDPE layer is about 10–20% of the thickness of the film, although it could be possible to provide a film with a layer of HDPE constituting as little as 5% or as much as 95% of the total plastic resin in the film.

Additives to the LLDPE may be made to alter some of its functional characteristics especially those that contribute to strength and tear resistance, without detracting from the spirit of the present invention. Additives of this type are well known.

Figure 4:
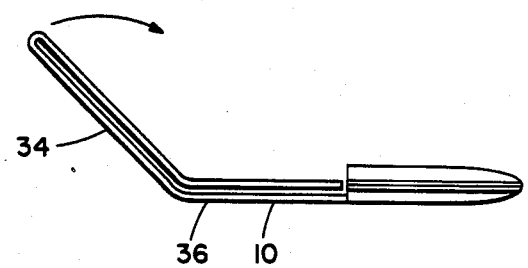
FIG. 4 is an edge view showing the seat cover in a partially unfolded position.

Referring again to the drawings, FIG. 4 shows a cover 10 in a partly folded and partly unfolded position, with FIG. 5 showing the cover in a further unfolded position. As shown in FIG. 5, retainer portion 24 of the cap 20 is formed on the sticky or inwardly facing side 30 of the cover, with the slippery side 32 of the cover facing outwardly. The covers of the present invention are formed in individual units and are individually folded for packaging. In folding each cover, it is significant that the sticky surfaces are folded so as to face each other. Thus, in FIG. 5, sticky surface 30' is folded inwardly against sticky surface 30. Then, as shown in FIG. 4, the cover is folded again, with portion 34 being folded against portion 36. Various folds after the first fold can be made in any manner necessary to provide a unit of the proper size.

One significant feature of the folding is that when the cover is folded in this manner, the sticky side faces inwardly and the slippery side faces outwardly from the folded unit. Thus, when the covers are stacked one on another in a box 38 of the type shown in FIG. 6, the units can be slipped out of the box one at a time without sticking to the next adjacent cover.

At the same time, another important advantage is achieved. When the cover is unfolded in the manner shown in FIG. 5, the separation of sticky surfaces 30 and 30' causes a frictional engagement that generates surface static electricity on the sticky side of the cover. Thus, when the cover is placed on a seat, the static electricity enhances the cling of the sticky surface of the seat cover to the seat. On the other hand, the slippery side of the seat cover generates less static electricity and permits movement of a person or other object across the outer surface of the seat cover.

Figure 6:
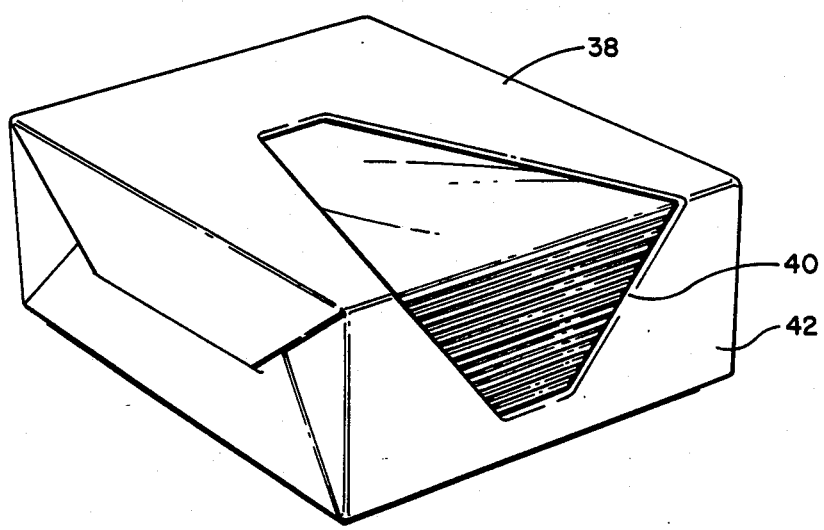
FIG. 6 is a perspective view showing a dispenser containing a number of folded seat covers.

As shown in FIG. 6, the seat covers may conveniently be packaged in a stack in individual units in box 38, with the box having a V-shaped opening 40 along one end 42 of the box, so as to provide access to the edges of the entire stack of covers.

With the seat covers of the present invention, it is an easy manner to protect a seat cover for an automobile mechanic or the like. Each mechanic can have a box of protective covers at his work station and can slip individual covers easily out of the box for use. When the covers are unfolded, the cling properties of the cover cause the cover to remain securely in place on the seat, even when the mechanic gets in the car and exerts a sideways displacement force on the upper or slippery side of the cover. After the car has been repaired, the seat cover can either be left in place to demonstrate to the customer that the service establishment has protected the customer's valuable upholstery, or the seat cover can be removed and discarded. In addition to having desirable cling properties, the seat covers of the present invention are highly impervious to the penetration of contaminants and are quite strong so as to resist tearing or puncturing.

It should be understood that the foregoing is merely illustrative of the preferred practice of the present invention and that various changes and modifications may be made in the arrangements and details of construction of the embodiments disclosed herein with departing from the spirit and scope of the present invention.

The embodiments in which an exclusive property or privilege is claimed are defined as follows:

1. A temporary protective cover for protecting the surface of a seat or the like comprising a plastic film that is shaped to cover the surface and is integrally formed of at least two plastic resins having different cling properties, each of the plastic resins forming one of the opposite surface layers of the plastic film and cover, one plastic resin having properties that cause the surface formed of that resin to be relatively sticky such that it tends to cling or stick to protected surfaces such as seat upholstery or the like, the other plastic resin having properties that cause the surface formed of that resin to be relatively slippery such that the surface permits objects to slide over the surface with less clinging attraction, the cling properties of the two plastic surfaces being sufficiently different that the cover tends to remain in its protective covering position when the sticky surface is placed against the protected surface, even though the more slippery side of the cover is subjected to a sideways dislodging force by a person or other object sliding across the cover.

2. A protective cover according to claim 1 wherein the cover comprises an elongated strip of plastic film that is long enough to cover the back and seat portion of a seat and width enough to cover at least an individual seat width of a seat, the cover having a pocket formed at an upper end thereof that fits over the top of the back of the seat so as to retain the upper end on the back of the seat, the cover over the back and seat portions of the seat with the sticky side of the cover facing the seat.

3. A protective cover according to claim 2 wherein the cover is wide enough to cover the entire width of the back and seat portions of a bench seat in an automobile.

4. A protective cover according to claim 1 wherein the cover is folded prior to use, with the sticky side of the cover being folded over against itself, such that when the cover is unfolded the clinging nature of the sticky side is enhanced by static electricity generated by separating the facing sticky sides of the cover.

5. A protective cover according to claim 4 wherein the cover is folded such that the slippery surface faces the exterior of the folded cover, thus permitting easy separation of separate covers that are stacked together for packaging.

6. A protective cover according to claim 5 wherein the folded cover is packed in multiple units in a dispenser box for removal of the covers one at a time for use, the slippery outer surfaces of the folded covers facilitating removal of the covers one at a time without sticking to the other covers in the box.

7. A protective cover according to claim 1 wherein the cover is formed of co-extruded plastic film, with the sticky side being formed of linear low density polyethylene or low density polyethylene and the slippery side being formed of high density polyethylene.

8. A protective seat cover according to claim 7 wherein the film is about 0.3 to 2.0 mils thick.

9. A protective seat cover according to claim 8 where the film is about 0.8 to 1.0 mils thick.

10. A protective seat cover according to claim 9 wherein high density polyethylene comprises a surface layer at least about five percent (5%) of the thickness of the film.

11. A protective seat cover according to claim 10 wherein the high density polyethylene comprises a surface layer about 10–20% of the thickness of the film.

12. A temporary, protective cover for a protected surface comprising a co-extruded plastic film formed of at least two plastic resins having different cling properties, one resin having enhanced cling properties relative to the other resin, the two resins being segregated at the opposite surfaces of the film such that the resin having enhanced cling properties forms a sticky surface on one side of the film and the other resin forms a relatively slippery surface on the other side of the film, the film being shaped to fit on and cover a surface to be protected with the sticky side facing the surface to be protected, the sticky side clinging to the surface and resisting displacement therefrom in the presence of a sideways displacement force exerted against the slippery side, whereby the cover permits objects to slide easily over the cover while causing the cover to cling or stick to the protecred surface.

13. A protective cover according to claim 12 wherein the resin with enhanced cling properties is linear low density polyethylene or low density polyethylene and the other resin is high density polyethylene, with the low density polyethylene or linear low density polyethylene being positioned against the protected surface, the layer of high density polyethylene having a thickness of 5% to 95% of the thickness of the film.

14. A protective cover according to claim 13 wherein the high molecular weight high density polyethylene comprises 10-20% of the thickness of the film.

15. A protective seat cover according to claim 13 wherein the film comprises surface layers of linear low density polyethylene and medium molecular weight high density polyethylene.

16. A temporary seat cover for the purpose of providing protection, constructed from a plastic film integrally formed from at least two differing plastic materials of dissimilar cling properties, one plastic material forming one side and the other plastic material forming the other side of the film, such plastic film exhibiting a relatively sticky side and a relatively slippery side and such sides being appropriately oriented in the construction of said seat cover so that the inwardly oriented sticky side contacts the protected seat and the outwardly slippery side forms the exterior surface of said seat cover.

17. A temporary seat cover as in claim 16, where the inwardly oriented sticky side also has the property of static attraction which is compatibly adherent to the protected seat.

18. A temporary seat cover as in claim 16, where the plastic film is comprised of a co-extrusion of at least two different plastic resins, the plastic resins being a high density polyethylene and a linear low density polyethylene.

19. A temporary cover as in claim 16, where said cover is configured to be storable with other like covers where contact during storage is limited to the slippery sides of such covers and the inwardly sticky side in each such seat cover is substantially limited to contact with itself.

20. A temporary seat cover as in claim 19, where the storable configuration of the cover enhances the retention of static potential on the inwardly oriented sticky side.

* * * * *